(12) United States Patent
Kraemer et al.

(10) Patent No.: US 11,651,367 B2
(45) Date of Patent: May 16, 2023

(54) SECURITY IN A COMMUNICATION NETWORK

(71) Applicant: INTERNATIONAL BUSINESS MACHINES CORPORATION, Armonk, NY (US)

(72) Inventors: James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 14/858,389

(22) Filed: Sep. 18, 2015

(65) Prior Publication Data

US 2017/0083910 A1 Mar. 23, 2017

(51) Int. Cl.
*G06Q 20/40* (2012.01)
*G06Q 20/06* (2012.01)

(52) U.S. Cl.
CPC ......... *G06Q 20/401* (2013.01); *G06Q 20/065* (2013.01); *G06Q 20/405* (2013.01)

(58) Field of Classification Search
CPC ............. G06F 9/45558; H04L 63/1408; H04L 63/1441; G06Q 10/06311; G06Q 20/108
See application file for complete search history.

(56) References Cited

U.S. PATENT DOCUMENTS

| | | | |
|---|---|---|---|
| 7,096,193 B1 * | 8/2006 | Beaudoin | G06Q 30/0273 |
| 8,447,273 B1 | 5/2013 | Friedlander et al. | |
| 8,510,420 B1 | 8/2013 | Brandwine et al. | |
| 8,515,036 B2 * | 8/2013 | Weinberg | G06Q 20/108 |
| | | | 379/114.01 |
| 8,539,589 B2 | 9/2013 | Prafullchandra et al. | |

(Continued)

OTHER PUBLICATIONS

Oxford English Dictionary, www.oed.com/view/Entry/266669?rskey=uv53XJ&result=2&isAdvanced=false#eid (last visited Oct. 27, 2022).).*

(Continued)

*Primary Examiner* — Steven S Kim
*Assistant Examiner* — Sima Asgari
(74) *Attorney, Agent, or Firm* — Stephen R. Yoder

(57) ABSTRACT

A computer-implemented method, system, and/or computer program product provides security in a communication network between a user device and a computer related device, and receives payment for services offered through a distributed registry associated with the communication network. One or more processors provide a distributed registry that specifies a plurality of services available to support communications between a user device and a computer related device on a communication network. The processor(s) dynamically construct one or more multi-node transient processing pathways between the user device and the computer related device based on the services. The processor(s) present the plurality of services specified by the distributed registry to the user device, and append metadata describing a current cryptocurrency cost of the services. The processor(s) then charge the current cryptocurrency cost to a cryptocurrency account associated with the user device and provide the particular service to the user device.

20 Claims, 8 Drawing Sheets

(56) References Cited

U.S. PATENT DOCUMENTS

| | | | |
|---|---|---|---|
| 8,732,182 B2* | 5/2014 | Bethlehem | H04L 12/2863 707/694 |
| 8,769,697 B2 | 7/2014 | McGinley et al. | |
| 8,799,985 B2 | 8/2014 | Vinberg et al. | |
| 9,245,284 B2* | 1/2016 | Hardin | G06Q 30/0273 |
| 9,398,028 B1* | 7/2016 | Karandikar | H04L 63/1408 |
| 9,553,888 B2* | 1/2017 | Stiansen | H04L 63/1491 |
| 9,606,831 B2* | 3/2017 | Ferris | G06F 9/4856 |
| 9,762,446 B2* | 9/2017 | Xu | H04L 41/12 |
| 2006/0123393 A1* | 6/2006 | Atkins | G06F 9/451 717/121 |
| 2007/0079307 A1 | 4/2007 | Dhawan et al. | |
| 2008/0040792 A1 | 2/2008 | Larson | |
| 2009/0070456 A1 | 3/2009 | Brown | |
| 2009/0228708 A1 | 9/2009 | Trostle | |
| 2009/0293058 A1* | 11/2009 | Ahn | G06F 21/10 718/1 |
| 2011/0138469 A1 | 6/2011 | Ye et al. | |
| 2012/0002813 A1 | 1/2012 | Wei | |
| 2013/0198746 A1 | 8/2013 | Kruglick | |
| 2013/0198840 A1 | 8/2013 | Drissi et al. | |
| 2013/0298244 A1 | 11/2013 | Kumar et al. | |
| 2013/0326505 A1* | 12/2013 | Shah | G06F 9/455 718/1 |
| 2013/0332927 A1 | 12/2013 | Tang et al. | |
| 2014/0019604 A1 | 1/2014 | Twitchell | |
| 2014/0033268 A1 | 1/2014 | Julisch et al. | |
| 2014/0052979 A1* | 2/2014 | Stella | H04L 12/2863 707/694 |
| 2014/0192645 A1 | 7/2014 | Zhang | |
| 2014/0244506 A1 | 8/2014 | Gramling | |
| 2015/0120569 A1 | 4/2015 | Belshe et al. | |
| 2015/0206106 A1 | 7/2015 | Yago | |
| 2015/0350239 A1* | 12/2015 | Kruglick | H04L 63/1441 726/23 |
| 2018/0083850 A1* | 3/2018 | Rabipour | H04L 43/08 |

OTHER PUBLICATIONS

See Oxford English Dictionary, www.oed.com/view/Entry/2476?rskey=68cCel&result=2&isAdvanced=false#eid, def. 2a. (last visited Oct. 27, 2022) (The verb "adjust" means [t]o arrange, alter, or modify (a thing).*

P. Mell et al., "The Nist Definition of Cloud Computing", National Institute of Standards and Technology, Information Technology Laboratory, Sep. 2011, pp. 1-7.

Dunn, Alan M., et al. "Eternal Sunshine of the Spotless Machine: Protecting Privacy with Ephemeral Channels." OSDI. 2012.

Li, Jianxin, et al. "CyberGuarder: A virtualization security assurance architecture for green cloud computing." Future Generation Computer Systems 28.2 (2012): 379-390.

Shin, Seungwon, and Guofei Gu. "CloudWatcher: Network security monitoring using OpenFlow in dynamic cloud networks (or: How to provide security monitoring as a service in clouds?)." Network Protocols (ICNP), 2012 20th IEEE International Conference on. IEEE, 2012.

Anonymous, "Contract—Bitcoin Wiki", en.bitcoin.it/wiki/Contract, last modified Jul. 8, 2015, retrieved Sep. 18, 2015, pp. 1-13.

List of IBM Patents or Patent Applications Treated as Related, Sep. 24, 2015, pp. 1-2.

U.S. Appl. No. 14/752,230, Notice of Allowance dated Jul. 16, 2018, pp. 1-13.

U.S. Appl. No. 14/752,230, Final Office Action dated Apr. 4, 2018, pp. 1-21.

U.S. Appl. No. 14/752,230, Non-Final Office Action dated Aug. 23, 2017, pp. 1-23.

* cited by examiner

US 11,651,367 B2

SECURITY IN A COMMUNICATION NETWORK

BACKGROUND

The present invention relates generally to cyber security and, in particular, to security maximization for a computer related device based on real-time reaction.

Cyber hacking is a widely known and prevalent problem. Many schemes have been tried to prevent or ameliorate the problem. These normally revolve around authenticating a user or building a firewall or setting permissions. These defensive measures have been useful but are limited.

SUMMARY

A computer-implemented method, system, and/or computer program product provides security in a communication network between a user device and a computer related device, and receives payment for services offered through a distributed registry associated with the communication network. One or more processors provide a distributed registry that specifies a plurality of services available to support communications between a user device and a computer related device on a communication network. The processor(s) dynamically construct one or more multi-node transient processing pathways between the user device and the computer related device based on a first service from the plurality of services. The processor(s) dynamically adjust the one or more multi-node transient processing pathways between the user device and the computer related device based on a second service from the plurality of services. For at least one node in each of the one or more transient processing pathways, an address thereof and a time period that the at least one node is active and capable of being used is adjusted based on at least one of an application programming interface type and a data request type implicated by a received packet by the user device. The processor(s) present the plurality of services specified by the distributed registry to the user device, and append metadata describing a current cryptocurrency cost of each of the plurality of services to a description of said each of the plurality of services. In response to receiving a request from the user device for a particular service from the plurality of services, the processor(s) charge the current cryptocurrency cost to a cryptocurrency account associated with the user device and provide the particular service to the user device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
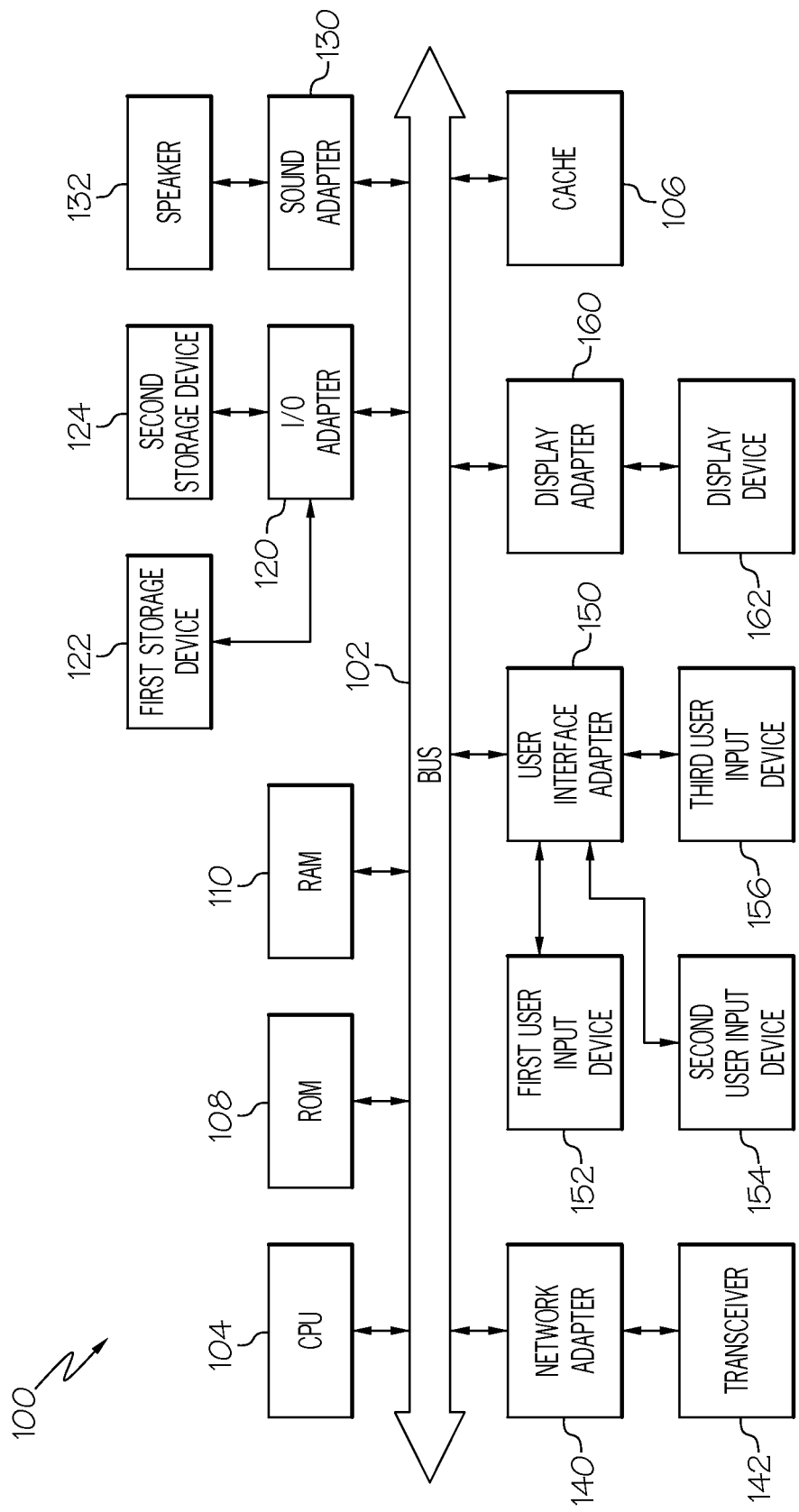
FIG. 1 shows an exemplary processing system 100 to which the present principles may be applied, in accordance with an embodiment of the present principles.

The present principles are directed to security maximization for a computer related device based on real-time reaction. In particular, the security maximization is provided between a user device and the computer related device. The computer related device can be a computer or computer system of any form (e.g., including, but not limited to computer-based transaction systems, and so forth) or a device related to a computer or computer system (e.g., any peripheral including, but not limited to, a router, a modem, a database, a printer, a scanner, a biometric device, an input device, and so forth).

In an embodiment, the present principles relate to an application of the Distributed Autonomous Corporation (DAC) concept to general-purpose cloud computing, including one-way or two-way anonymization using one or more proxies similarly to Tor or I2P. The integrated anonymization function can have one or multiple layers of anonymization. By implementing a distributed cloud computing infrastructure as a DAC with robust integrated anonymity for both service requesters and service providers an assurance of privacy is provided that is impossible to obtain in current cloud computing systems.

In an embodiment, the present principles provide a system and method that are highly responsive and resistive to probabilistic threat levels in a highly variable manner based on risk value.

In an embodiment, the present principles maximize the security for a computer related device based on real-time reaction to a dynamically computed probabilistic threat security assessment utilizing multi-layered virtual machine engines that are dynamically configured into a highly dynamic, occulted, topology of processing lanes.

In an embodiment, the present principles can reduce the probability of a successful attack on a computer related device using a real-time risk sensitive system that dynamically alters a multi-node processing pathway between the user and the computer related device. The nodes are composed of virtual machines (VMs) in a highly variable topology. These virtual machines must be addressed in the proper sequence, at the proper address, using the correct encryption code and during the right time window (when the relevant nodes are active). Normally only the entrance VM is in existence and visible. The other nodes are instantiated only as needed by an out-of-plane control node. Depending upon the risk level, different processing lanes are constructed for each function required to interact with data (e.g., functions including, but not limited to, issuing a command, viewing a return set, and so forth). The topology of the lanes and nodes is re-phased on a quasi-random scheme. This mechanism is highly resistant to picking because of the defense in depth that requires multiple dimensions of precision to successfully interact with the transaction system or the data. Getting anything in the wrong order, or at the wrong address or with the wrong key will be totally successful in preventing an attack. Moreover, any partial pick will provide no advantage for a future attack.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
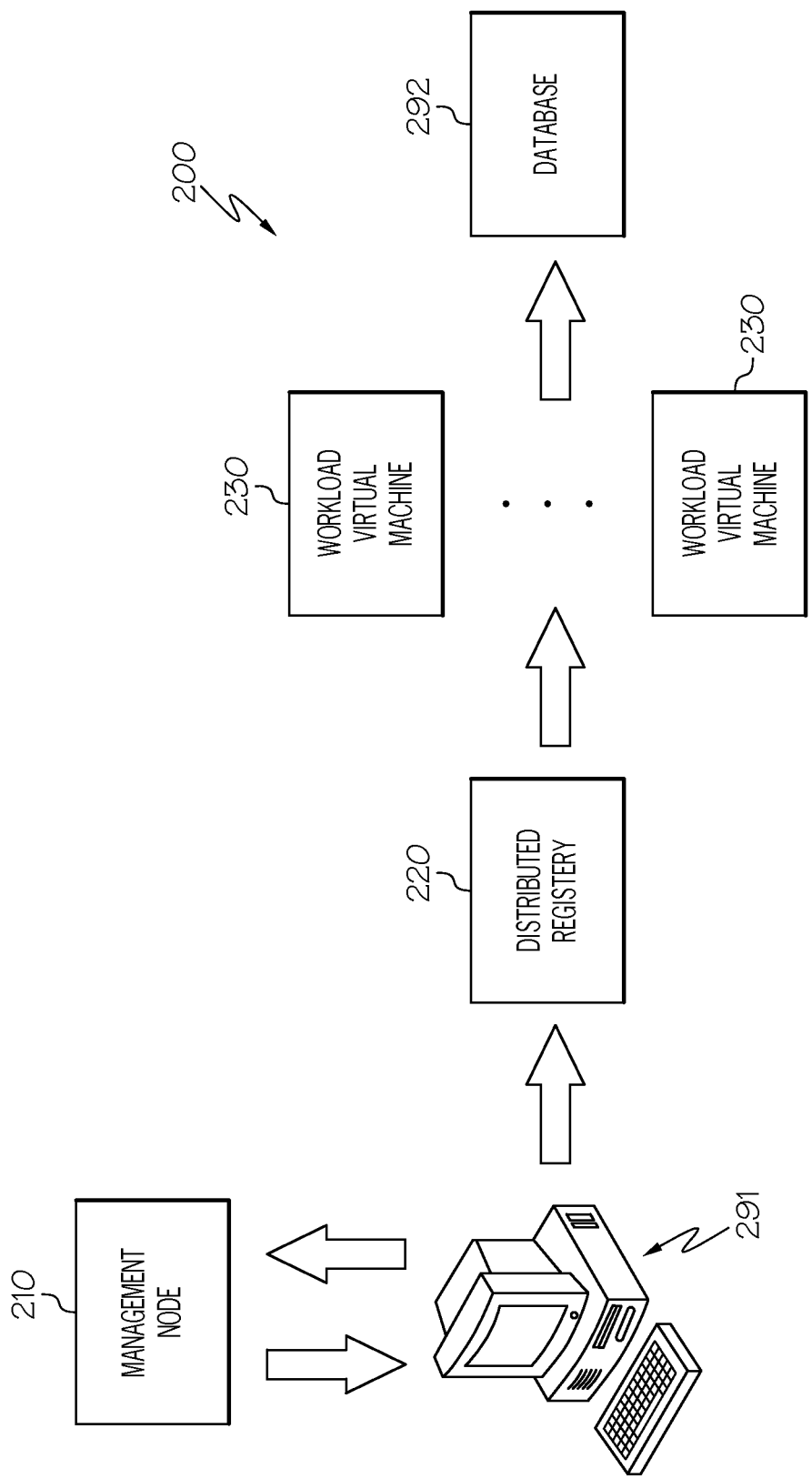
FIG. 2 shows an exemplary system 200 for security maximization for a computer related device, in accordance with an embodiment of the present principles.
Figure 3:
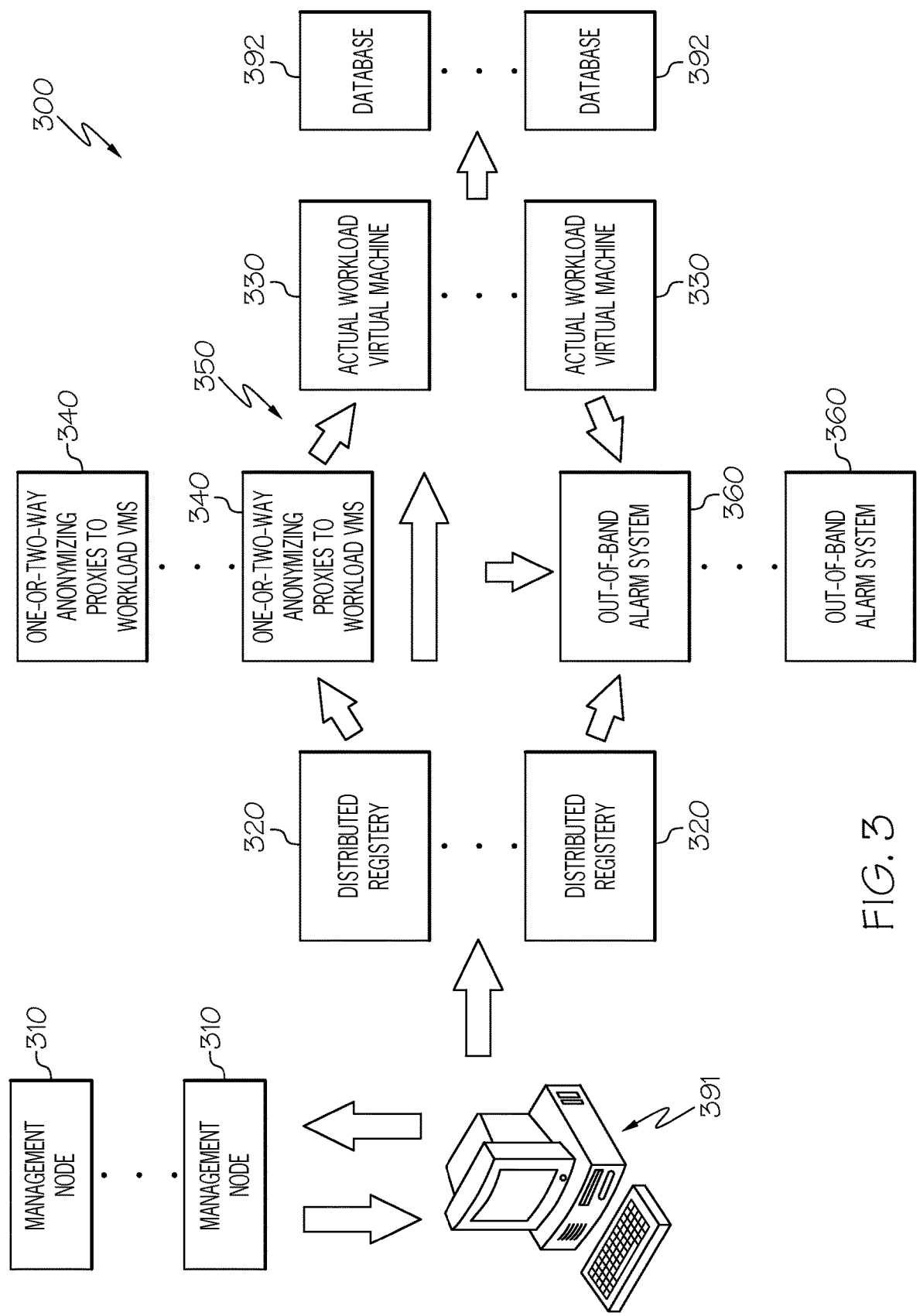
FIG. 3 shows another exemplary system 300 for security maximization for a computer related device, in accordance with an embodiment of the present principles.

Moreover, it is to be appreciated that systems 200 and 300 described below with respect to FIG. 2 and FIG. 3 are systems for implementing respective embodiments of the present principles. Part or all of processing system 100 may be implemented in one or more of the elements of system 200 and/or in one or more of the elements of system 300.

Figure 4:
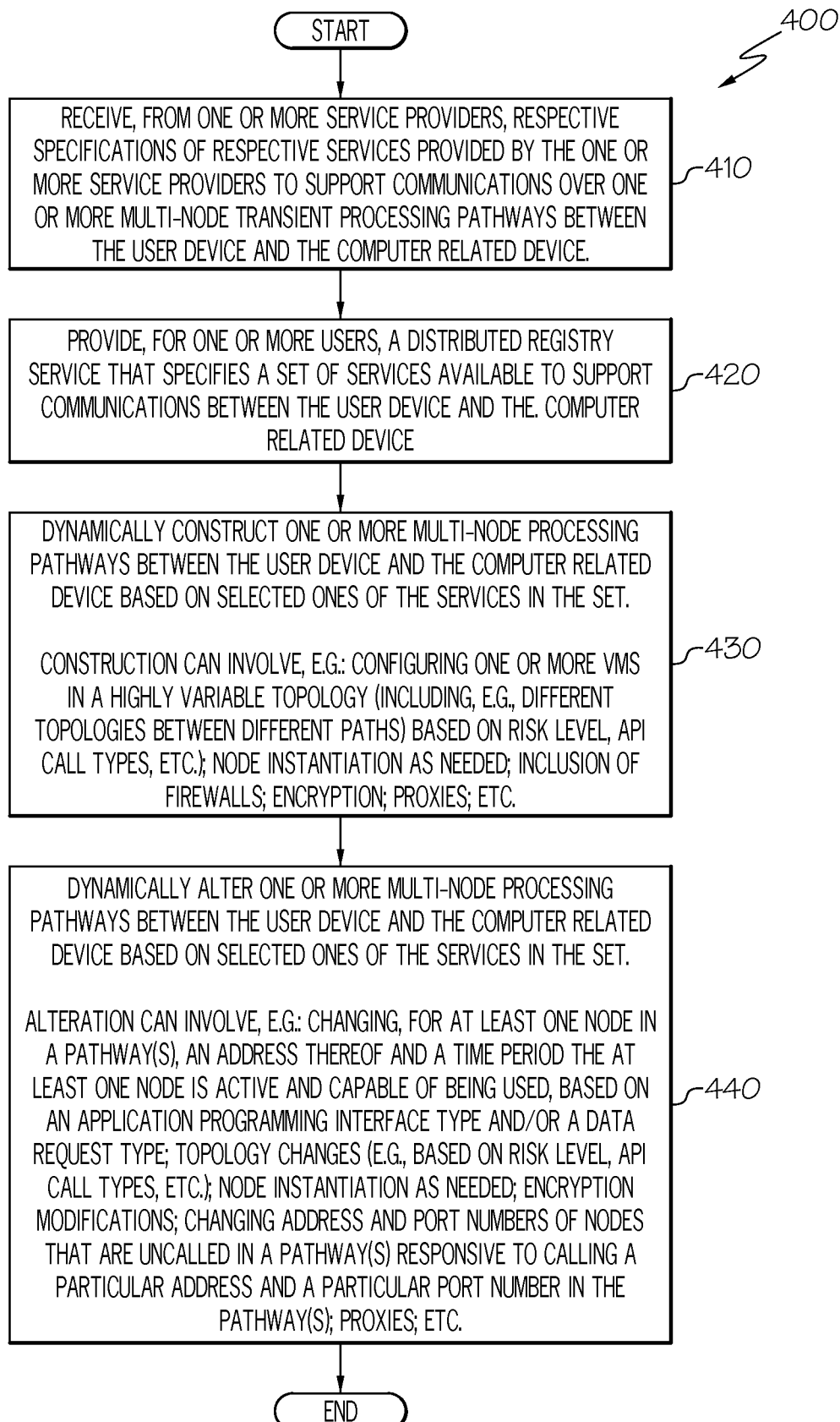
FIG. 4 shows an exemplary method 400 for security maximization for a computer related device, in accordance with an embodiment of the present principles.

Further, it is to be appreciated that processing system 100 may perform at least part of the method described herein including, for example, at least part of method 400 of FIG. 4. Similarly, part or all of system 200 and/or part or all of system 300 may be used to perform at least part of method 400 of FIG. 4.

It is to be appreciated that there can be some overlap between the elements of system 200 and system 300. As such, descriptions of various aspects of various elements of one system while not explicitly mentioned with respect to the other system for the sake of brevity, can also apply to various aspects of various elements of the other system while maintaining the spirit of the present principles.

FIG. 2 shows an exemplary system 200 for security maximization for a computer related device, in accordance with an embodiment of the present principles.

For illustrative purposes, the example of FIG. 2 can be considered to apply and/or otherwise represent a secure work location at predicted hours. Of course, the present principles in general and system 200 in particular can be applied to other situations while maintaining the spirit of the present principles.

The system 200 is used to maximize the security between a user workstation 291 and a database 292. The user workstation 291 hosts browser sessions sent back by each function in a chain of functions.

The system 200 includes and/or otherwise involves a management node 210, a distributed registry 220, and a set of workload virtual machines (VMs) 230. While the embodiment of FIG. 2 includes only one each of the preceding elements 210 and 220, it is to be appreciated that other embodiments of the present principles can include more than one of any of the preceding elements 210 and 220.

The management node 210 specifies one or more processing paths based on risk. In an embodiment, the management node 210 configures the set of VMs 230 to form one or more multi-node processing paths (lanes) based on risk. Further details regarding the configuring of the set of VMs is described below.

The management node 210 also performs risk assessment where, as noted above, such risk assessment is used to specify one or more processing paths. This risk assessment is described in further detail herein below.

The distributed registry 220 includes encrypted and/or algorithmically occluded pointers to the set of workload VMs 230. In an embodiment, the distributed registry 220 can be implemented as a distributed hash table. Other forms are also possible for the distributed registry 220, while maintaining the spirit of the present principles.

The set of workload VMs 230 form the nodes of a multi-node processing pathway(s) between the user workstation 291 and the database 292. In an embodiment, one or more of the workload VMs 230 form a respective node of a respective multi-node processing pathway. The VMs 230 are described in further detail herein below.

FIG. 3 shows another exemplary system 300 for security maximization for a computer related device, in accordance with an embodiment of the present principles.

For illustrative purposes, the example of FIG. 3 can be considered to apply and/or otherwise represent a problematic location in a problematic country outside of predicted hours. Thus, the example of FIG. 3 can also be considered to represent a highly insecure example, in contrast to the example of FIG. 2 which is presumably somewhat more secure. Of course, the present principles in general and system 300 in particular can be applied to other situations while maintaining the spirit of the present principles.

The system 300 is used to maximize the security between a user workstation 391 and a distributed database 392. The user workstation 391 hosts browser sessions sent back by each function in a chain of functions. The distributed database 392 represents a set of services that can include, but are not limited to, relational or noSQL database services and/or other storage and/or state maintenance functions, and which overlap with the workload virtual machines 330.

The system 300 includes and/or otherwise involves a set of management nodes 310, a set of distributed registries 320, a set of workload virtual machines 330, a set of one-way or two-way anonymizing proxies to workload VMs 340, multiple layers of indirection 350, and a set of out-of-band alarm and control systems 360.

The set of management nodes 310 specifies one or more processing paths based on risk. In an embodiment, the set of management nodes 310 configure the set of VMs 330 and the set of one-way or two-way anonymizing proxies to workload VMs 340 to form one or more multi-node processing paths (lanes) based on risk. Further details regarding the configuring of the set of VMs is described below.

The set of management nodes 310 also perform risk assessment where, as noted above, such risk assessment is used to specify one or more processing paths. This risk assessment is described in further detail herein below.

In an embodiment, the set of management nodes 310 are implemented as a distributed set.

The set of distributed registries 320 include encrypted and/or algorithmically occluded pointers. For example, in an embodiment, the set of distributed registries 320 can be based on a cryptographic block chain, as various cryptocurrencies are today. In an embodiment, one or more of the distributed registries in the set can be implemented as a distributed hash table. Other forms are also possible for any of the distributed registries 320, while maintaining the spirit of the present principles.

Once the set of management nodes 310 is established, their primary function is to establish a globally distributed service registry. Any nodes attaching to the network may advertise a service, and the availability of this service is advertised to the rest of the network. In an embodiment, the service availability is advertised in a similar way to the BitTorrent network propagating the availability of a file. In an embodiment, services are standardized using a system of common service codes; version numbers can be standardized, and management nodes can opt not to accept unknown service codes or service codes below a version number. The registry service itself may also be advertised between nodes with a version number, subject to these same optional limitations.

A distributed registry service, operated across the distributed network of management nodes, is the function that enables the proxy service, the various hosting services for workload virtual machines, and the database services to be advertised to anyone attaching to the network. Anyone connecting to the network via a management mode can advertise a service or request a service of a node that has advertised one.

Service advertisements, requests for service, and completed transactions can optionally be logged as a transaction in the distributed registry.

The set of workload VMs 330 form at least some of the nodes of a multi-node processing pathway(s) between the user workstation 391 and the database 392. In an embodiment, one or more of the workload VMs 330 form a respective node of a respective multi-node processing pathway. The VMs 230 are described in further detail herein below.

The one-way or two-way anonymizing proxies to workload VMs 340 provide one-way or two-way anonymity regarding communications between the user workstation 391 and a distributed database 392.

The one-way or two-way anonymizing proxies to workload VMs 340 provide a second general service, which is advertised on the distributed registry and propagated through the network composed of management nodes as a proxy service for the purpose of anonymization. In an embodiment, this service can be implemented to be directly comparable to Tor and I2P and can optionally make use of these existing networks. However, the proxy service is intended to allow one way or two-way anonymity and is integrated with the registry service such that all services may be registered either anonymously or in the clear or both. Likewise, all services may be requested and transactions brokered through the network either anonymously or in the clear. Finally, all advertisements, requests, and transactions may be required to go through one or more layers of anonymization for greater privacy and security.

The multiple layers of indirection 350 can be used when routing communications between the user workstation 391, the workload VMs 330, and the distributed database 392 through the set of one-way or two-way anonymizing proxies to workload VMs 340. In this way, subsequent hops through the nodes are made difficult to predict.

The set of out-of-band alarm and control systems 360 provide additional security for the communications between the user workstation 391, actual workload virtual machine 330, and distributed database 392.

In order to provide security for the control of virtual machines being run on actual hardware, all control signals and system commands can use cryptography to prevent their interception by outsiders. Additionally using a separate communications network for the commands separate from anonymized communication flows (as per the one-way or two-way anonymizing proxies to workload VMs 340) will make interception and decryption significantly more difficult. All control, allocation, de-allocation, movement of running virtual machines, and security messages will be sent to different IP addresses, well-known port numbers, utilizing encrypted communications. The present principles are not limited to any particular encryption technology or protocol. Thus, any encryption technology and protocol as applicable can be used in accordance with the teachings of the present principles, while maintaining the spirit of the present principles. By utilizing different and shifting IP addresses, independent of communications related to the distributed workload, determinations of which message went to which actual physical hardware will increase the difficulty of interception many fold. It is also possible to provide an independent communications network for out-of-band control communications. This could include, for example, but is not limited to, physical communication means such as light fiber, a local area network not connected to the Internet, or physical traces on motherboards.

If penetration attempts are detected, the control system can order the anonymizing proxies to issue all new communications to altered IP addresses and well-known port numbers. Ideally, the out-of-band alarm and control system 360 would run on different hardware than the anonymizing proxies 340. Upon receiving notifications from the out-of-band alarm and control system 360 that penetration attempts have been detected, commands will be sent to anonymizing proxies 340 with new IP addresses and well-known port numbers generated by the out-of-band alarm and control system 360. The anonymizing proxies 340 will not be informed why addresses are being changed, only that they must to do so immediately. Detection of penetration attempts may be determined by out of band alarm and control systems or other external security or network monitoring programs.

Out-of-band alarm and control system 360 will only know virtual IP addresses and not physical IP addresses. This has two major advantages. One advantage is that it eases the difficulties of configuring a zero knowledge network. Another advantage is that it provides a level of security when actual physical IP addresses are not known by the anonymizing proxies 340 nor the out-of-band alarm and control system 360.

FIG. 4 shows an exemplary method 400 for security maximization for a computer related device, in accordance with an embodiment of the present principles.

At step 410, receive, from one or more service providers, respective specifications of respective services provided by the one or more service providers to support communications over one or more multi-node transient processing pathways between the user device and the computer related device. The services can include, but are not limited to, one-way and/or two-way anonymizing proxy services, indirection services, workload virtual machines services, out-of-band control communication services, and so forth.

At step 420, provide, for one or more users, a distributed registry service that specifies a set of services available to support communications between the user device and the computer related device. The set of services can include one or more services whose respective specifications were received in step 410. In an embodiment, the set of services or a selection of at least some of the services can be determined based on, for example, a probabilistic threat assessment of potential threats against the computer related device. In an embodiment, the probabilistic threat assessment indicates a respective threat level.

At step 430, dynamically construct one or more multi-node processing pathways between the user device and the computer related device based on selected ones of the services in the set. For example, a user may select various services from the set of services based on the user's needs, an expected threat, and so forth.

In an embodiment, each of the one or more multi-node processing pathways includes a beginning node, an end node, and a set of intervening nodes. In an embodiment, at least the set of intervening nodes are instantiated on demand by an out-of-plane control node (e.g., a management node) and, thus, may last for varying lengths of time. In an embodiment, only the beginning node is normally in existence and externally visible.

The nodes of each of the one or more processing paths are configured to have a highly variable topology, and must be addressed in the proper sequence, at the proper address, using the correct encryption code, and during the right time window (when the relevant nodes are active). In an embodiment, the topology of the nodes and the corresponding processing paths that they form are re-phased on a quasi-random scheme. In an embodiment, each node of the one or more multi-node processing pathways includes a portion for receiving directions from a user or preceding nodes or an out-of-band alarm and control system, a firewall portion, and at least one portion for directing subsequent nodes and/or actions.

In an embodiment, the one or more multi-node processing pathways are constructed to include one or more sets of virtual machines (e.g., workload VMs and/or one-or-two-way anonymizing proxies to workload VMs) with a variable topology.

In embodiment, step 430 can involve constructing a respective multi-node processing pathway for each respective function from a set of functions required to interact with data, based on a risk level indicated by the probabilistic threat assessment.

In an embodiment, each of the one or more multi-node processing pathways is constructed to have a different topology that is based on which of a plurality of different types of application programming interface calls are invoked for a current session between the user device and the computer related device.

In an embodiment, proxies can be used in the one or more multi-node processing pathways.

At step 440, dynamically alter one or more multi-node processing pathways between the user device and the computer related device based on selected ones of the services in the set. In an embodiment, step 440 can involve changing, for at least one node in a processing pathway(s), an address (e.g., an Internet Protocol (IP) address and/or a media access control (MAC) address) thereof and a time period the at least one node is active and capable of being used, based on an application programming interface type and/or a data request type (e.g., implicated by a received packet).

In an embodiment, each of the one or more multi-node processing pathways is altered more frequently based on increasing threat level and is altered less frequently based on decreasing threat level. In an embodiment, a node topology of each of the one or more multi-node processing pathways is re-phased on a quasi-random scheme.

In an embodiment, step 440 can involve changing address and port numbers of nodes that are uncalled in at least a given one of the one or more multi-node processing pathways in response to calling a particular address and a particular port number in the given one of the one or more multi-node processing pathways.

In an embodiment, each of the one or more multi-node processing pathways is altered to have a different topology that is based on which of a plurality of different types of application programming interface calls are invoked for a current session between the user device and the computer related device.

In an embodiment, multiple layers of indirection can be implemented in the communications between the user workstation and the distributed database.

In an embodiment, encryption keys and/or types of encryption keys can be varied for one or more of the nodes in the one or more multi-node processing pathways.

In an embodiment, proxies can be used in the one or more multi-node processing pathways.

A description will now be given regarding various advantages and exemplary implementations of the present principles.

Advantageously, the present principles dynamically provide the necessary level of security based on probabilistic risks and processing activity. The response level consumes resources in an optimized manner proportional to the threat(s). Above the lowest level of threat, the topology of the system is highly dynamic and highly variable with an ultra-low level of repeated patterning. In an embodiment, a low threat environment can have a logical path of, for example, two nodes. In an embodiment, a high level threat can have a path of, for example, twenty or more nodes with only one visible known point (node). It is to be appreciated that the preceding numbers of nodes are merely illustrative and, thus, other numbers of nodes may be used in accordance with the teachings of the present principles, while maintaining the spirit of the present principles. In an embodiment, processing paths expand on a horizontal plane (conceptually) according to plans that are spread across multiple platforms, at multiple different addresses, for variable lengths of time.

In an embodiment, the present principles can provide a unique topology of changing IP addresses and port numbers for each different type of application programming interface (API) call and data request. When a new IP packet arrives at a correct IP address, the packet is analyzed to determine what API call, database request, analytic algorithm, source data systems to fulfill a federated database query, or executable program is being requested. Guessing IP addresses and port numbers would be insufficient to hack into the protected device or communication between the user and the protected device. Also, calling one of the specific IP address and port numbers would cause all the other IP addresses and port numbers, which were not called, to also change. By adding a topology for each type of call, the present principles advantageously provide a significant advancement over the current state of the art.

A description will now be given regarding defining a threat level, in accordance with an embodiment of the present principles.

The threat level is determined based on, for example, an N dimensional, nonlinear threat matrix. Factors can include, but are not limited to, one or more the following: CRUD activity (Create, Read, Update, Delete); volume; element/transaction sensitivity; known secure location versus known insecure location; are you where your calendar says you will be (e.g., agreement there between lowers the risk level, while disagreement there between raises the risk level); personal/cohort known pattern agreement; and so forth. It is to be appreciated that the preceding factors for determining threat level are merely illustrative and, thus, other factors can also be used in accordance with the teachings of the present principles, while maintaining the spirit of the present principles. Moreover, the following characteristics relating to threat level are also illustrative and, thus, other characteristics can also be used in accordance with the teachings of the present principles, while maintaining the spirit of the present principles.

In an embodiment, the threat level can be implemented as a nonlinear function of the various threats versus the activities involved.

The threat level can be symmetrical or asymmetrical. As an example, the threat level can be kept at a higher level once a high level is achieved and can be ratcheted back slowly thereafter.

In an embodiment, the threat level can be tracked temporally across multiple sessions and periods of time.

A description will now be given regarding several aspects of the present principles, in accordance with an embodiment of the present principles.

In an embodiment, the user is separated from any direct interaction with data/transaction system.

In an embodiment, the connection between the user and a computer related device is made through one or more multi-node processing pathways made of multiple layers of VM machines. In an embodiment, the VM machines come into existence only when correctly summoned and may last for varying lengths of time. In an embodiment, the placement topology of the VM machines is highly variable. In an embodiment, the placement of the machines is always occulted from the user and external visibility.

In an embodiment, each node of a multi-node processing pathway has a section to receive direction from the user or preceding nodes, a firewall section, and a section to direct subsequent nodes or actions.

In an embodiment, all communications, at all stages, are encrypted with multiple types of encrypted keys and may be rotated during sessions and be different from node to node.

A description will now be given regarding why the system and method provided in accordance with the present principles is essentially impervious to attacks.

To successfully beat the system, an attacker must successfully predict/crack the following: Internet Protocol (IP) address and the time the node is active (noting that active nodes appear and disappear); the number of nodes in the topology (which include a beginning node, a variable number of middle nodes, and end node); the locations of nodes; the encrypted keys of the nodes; the sequence of actions; and the timing of nodes being created and destroyed in the processing quantum form.

Thus, the system described above enables services to be offered and procured anonymously through a distributed peer to peer registry and optional one- and two-way anonymizing proxies. In order to pay for such services privately (and/or anomalously), in one or more embodiments of the present invention the system advertises (presents) through the distributed registry metadata indicating a cost in cryptocurrency for the services. This cryptocurrency is negotiated through an automated, anonymous mechanism and changes hands automatically.

A cryptocurrency is defined as a medium of exchange using cryptography to secure the transactions and to control the creation of new units of cryptocurrency. That is, cryptocurrency is a cyber-currency in which a contract is made between parties to set the value of the cryptocurrency, to control the level of cryptocurrency in the system, and to store the cryptocurrency in electronic databases, thus leading to a peer-to-peer system of digital currency. Cryptocurrency has several advantages over conventional currencies.

First, cryptocurrency allows purchases to be made with a certain level of anonymity, thus allowing companies to purchase goods and/or services without alerting competitors of such purchases.

Second, cryptocurrency is accessible to anyone with access to the Internet (e.g., via a smart phone), thus providing banking services to persons in economically undeveloped areas.

As described below, services advertised through the distributed registry described above are tagged with an attribute indicating cost in cryptocurrency.

Units of cost may be, for example, portions of a unit of cryptocurrency for: a unit of computing work done; an amount of storage per unit of time: a specific Software as a Service (SaaS) or Platform as a Service (PaaS) service for a specific completed job or for a unit of time; and/or a one-time brokered transaction such as an anonymized procurement of service over the distributed cloud network. This anonymity allows a company to ensure that services procured and paid for are not publicly disclosed, thereby protecting trade secrets, corporate business strategies, etc. Of course, payment of such services continues to be ultimately disclosed as required by tax and business code regulations. But the services themselves that are procured can remain secret.

Atomicity: Services procured through the distributed may be atomic such that several microtransactions are linked and executed in "all or nothing" form. For example, the procuring end user may choose to procure an offered service through two layers of anonymizing proxies. That is, two anonymizing proxies advertise that they will anonymize a particular SaaS service transaction for 0.00001 of a cryptocurrency unit, and the advertising SaaS service offers its service for 0.010 cryptocurrency unit for a unit of work. The procuring end station may then specify that the three transactions are atomic, sending the transaction through the first proxy and then the second to the SaaS server, with all three transactions executing together.

Provably Unspendable Fees: Services may optionally advertise for a provably unspendable cryptocurrency fee. For example, if a service provider does not desire to profit from the service but wants a mechanism that will prevent denial of service through massive overuse, the provider may require that in order to procure the service, the procuring party must "sacrifice" a certain amount of cryptocurrency.

Contracts, including escrow, mediation, and deposit: A preferred embodiment of the present invention includes the Atomicity feature, and uses Distributed Cryptocurrency Contracts (e.g., cryptocurrency software script) to enable two- or multi-party transactions with minimal need for trust between parties. Additional features of cryptocurrency contracts and scripts can be used to enable deposits to be made beforehand for certain procured services, and for payment to be rendered with untrusted third parties—human or automated—acting as escrow agents and/or dispute mediators.

Cryptocurrency services: A distributed cloud network may optionally be used to provide cryptocurrency-specific services including currency exchange and transaction privacy and/or anonymization services.

Figure 5:
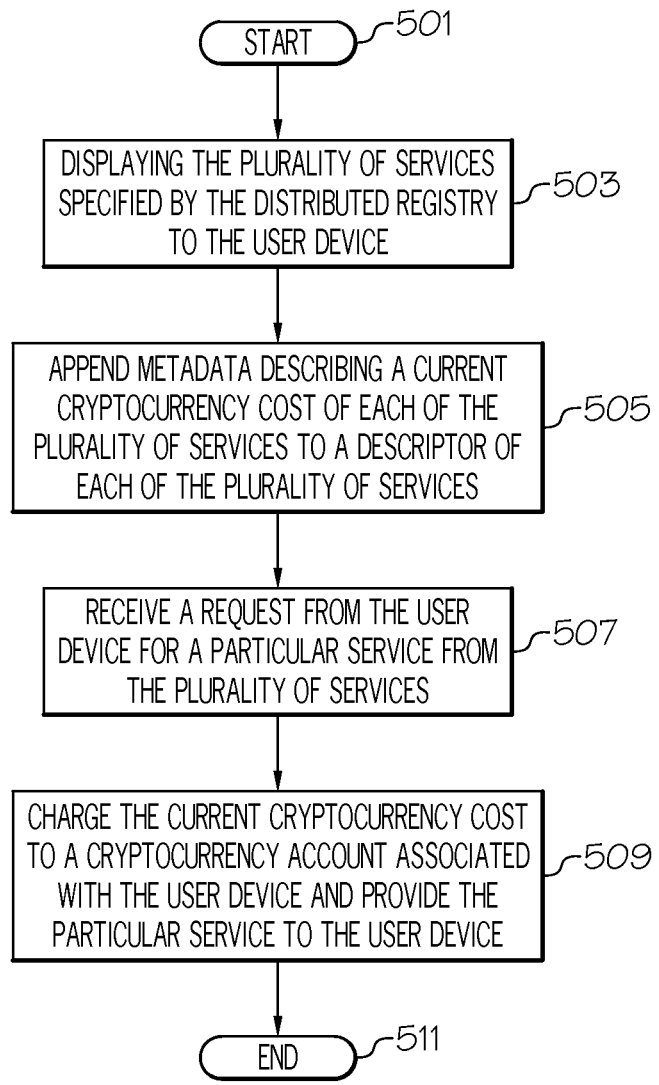
FIG. 5 is a high-level flow chart of one or more steps performed by one or more processors or other hardware devices to receive cryptocurrency payment for services presented by a distributed registry.

Thus, with respect now to FIG. 5, steps performed by one or more processors and/or other hardware devices to receive payment for services provided by the distributed registry is presented.

After initiator block 501, one or more processors display the plurality of services specified by the distributed registry (see above) to the user device, as described in block 503.

As described in block 505, the processor(s) then append metadata describing a current cryptocurrency cost of each of the plurality of services to said each of the plurality of services. That is, each service is described in a descriptor, and each descriptor has metadata describing a cryptocurrency cost of the service.

As described in block 507, the processors(s) receive a request from the user device for a particular service from the plurality of services.

As described in block 509, in response to receiving a request from the user device for a particular service from the plurality of services, the processor(s) charge the current cryptocurrency cost to a cryptocurrency account associated with the user device and providing the particular service to the user device.

The flow-chart ends at terminator block 511.

Thus, the process depicted in FIG. 5 allows a user to anonymously pay for services presented in the distributed registry described above.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
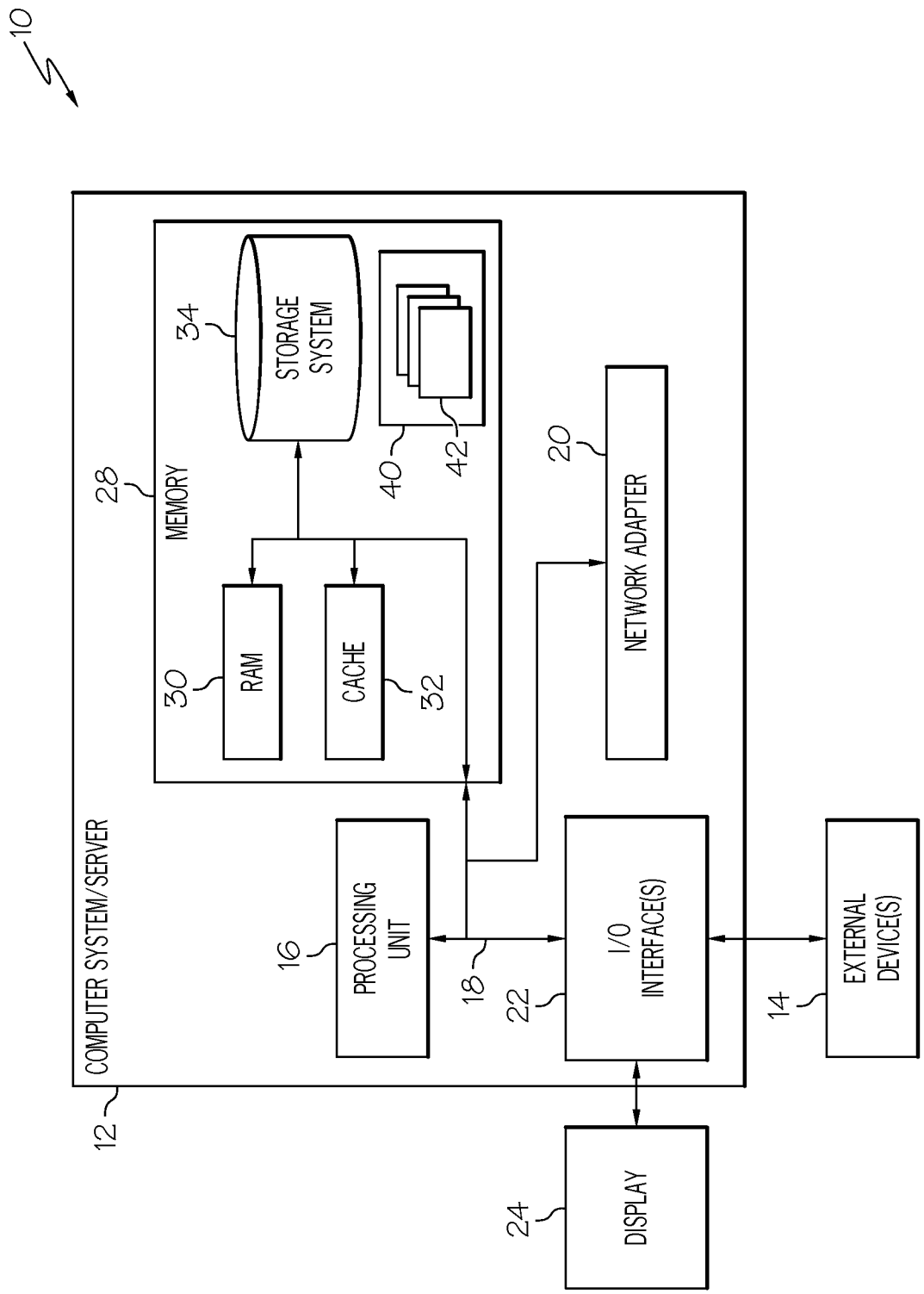
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
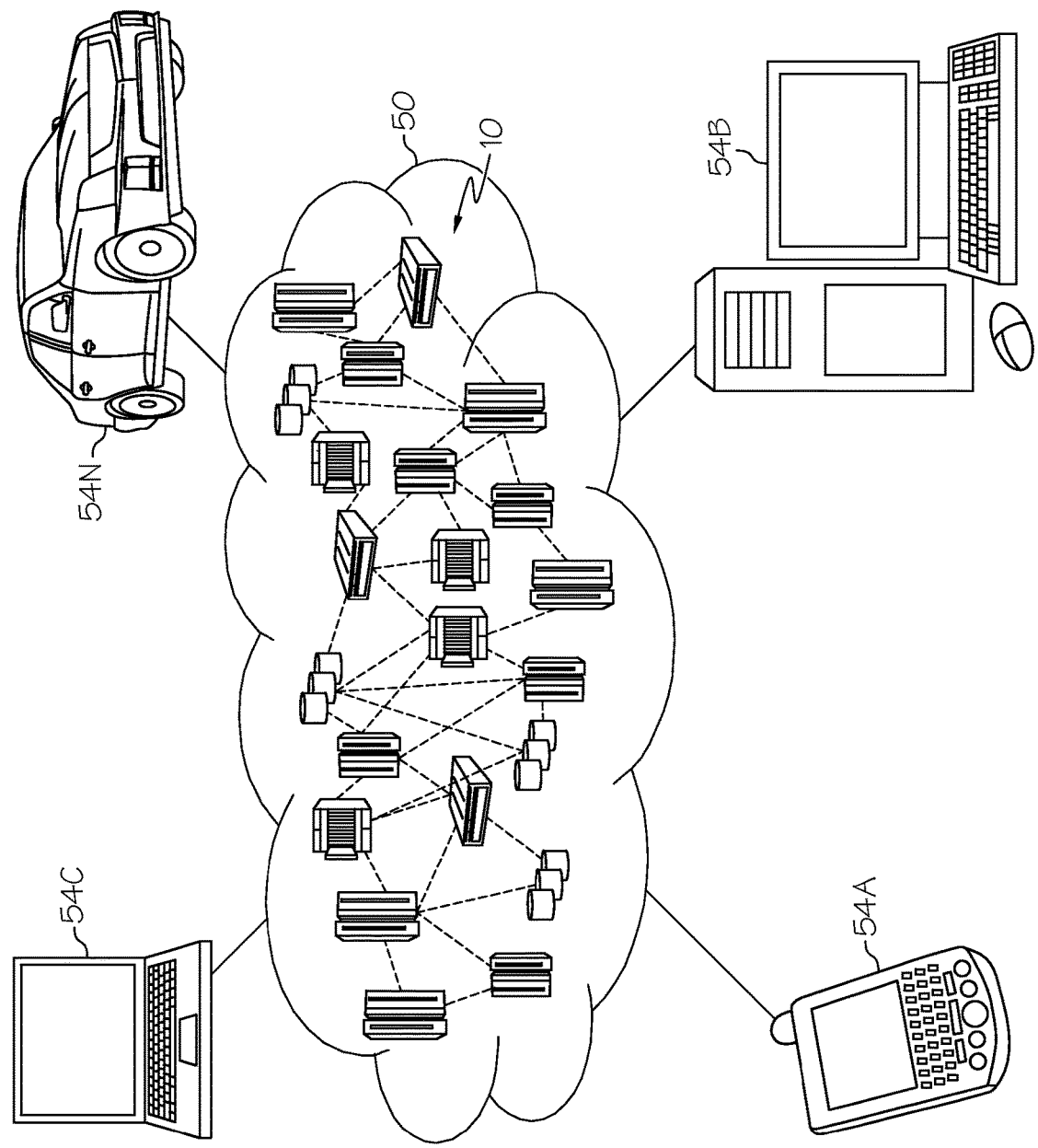
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 7 are intended to be illustrative only and that computing nodes 10 and cloud computing environment 50 can communicate with any type of computerized device over any type of network and/or network addressable connection (e.g., using a web browser).

Figure 8:
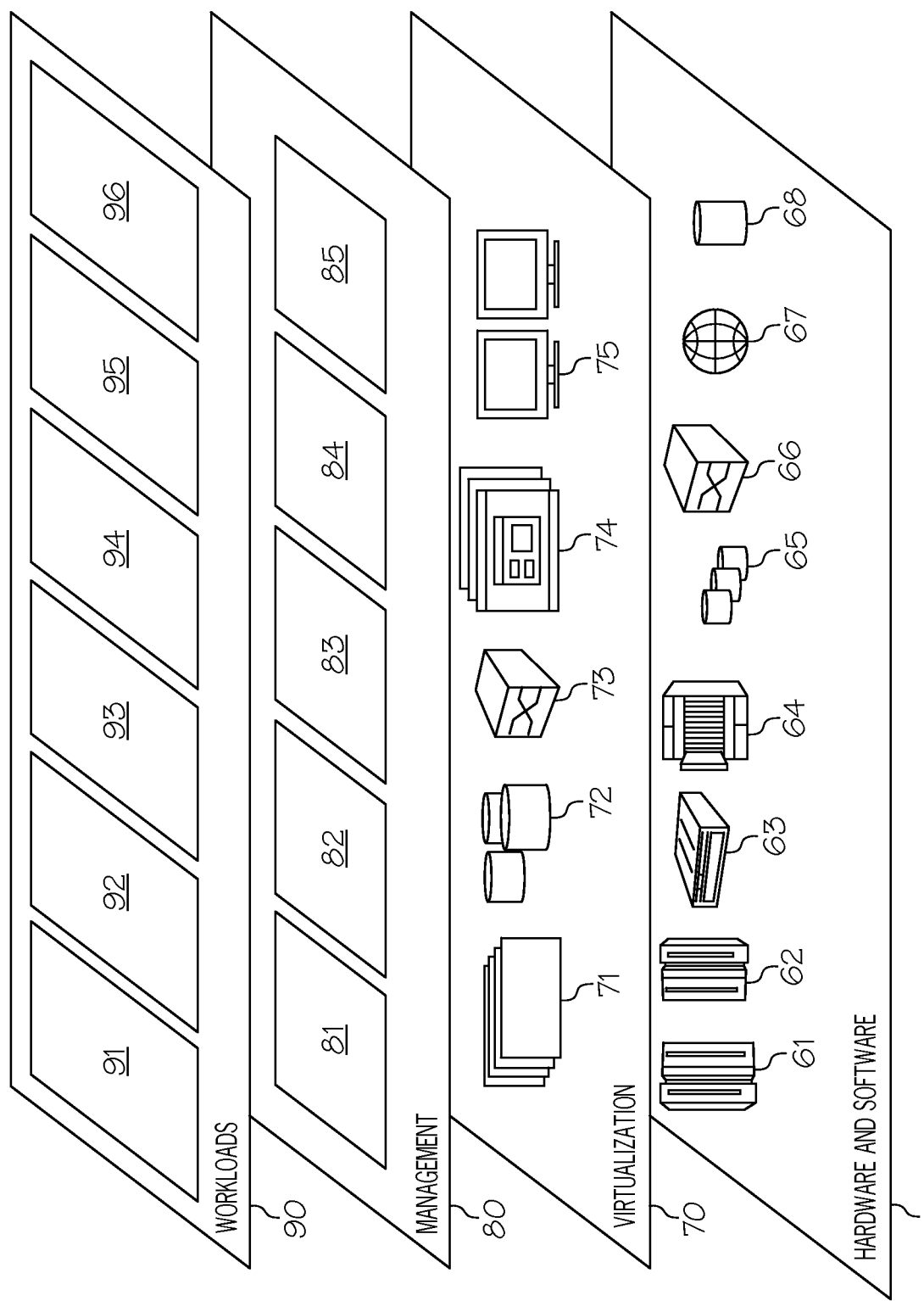
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network security processing 96 (for providing security in a communication network between a user device and a computer related device and for receiving payment for services offered through a distributed registry associated with the communication network as described herein).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. A computer-implemented method comprising:
providing, by one or more processors, a distributed registry that specifies a plurality of services available to support communications between a user device and a computer related device on a communication network, wherein the plurality of services are from a group of services consisting of an anonymizing proxy service for providing one-way or two-way anonymity for the communications, indirection services, workload virtual machines services, and out-of-band control communication services;
constructing, by the one or more processors, one or more multi-node transient processing pathways between the user device and the computer related device based on a first service from the plurality of services, wherein at least one of the one or more multi-node transient processing pathways utilizes a node that is only active for a predefined time period; and
adjusting, by the one or more processors, the at least one node in the one or more multi-node transient processing pathways between the user device and the computer related device based on a second service from the plurality of services, wherein for said at least one node in each of the one or more multi-node transient processing pathways, an address thereof and the predefined time period that the at least one node is active and capable of being used is adjusted, by the one or more processors, based on at least one of an application programming interface type and a data request type implicated by a received packet by the user device.

2. The computer-implemented method of claim 1, further comprising:
  calling, by the one or more processors, a particular address and a particular port number in a given one of the one or more multi-node transient processing pathways; and
  in response to the one or more processors calling the particular address and the particular port number in the given one of the one or more multi-node transient processing pathways, changing address and port numbers of nodes that are uncalled in at least a given one of the one or more multi-node transient processing pathways.

3. The computer-implemented method of claim 1, wherein each of the one or more multi-mode transient processing pathways comprise a plurality of virtual machines with a variable topology.

4. The computer-implemented method of claim 1, further comprising:
  providing, by the one or more processors, a probabilistic threat assessment of potential threats against the computer related device; and
  selecting the particular service based on the probabilistic threat assessment.

5. The computer-implemented method of claim 4, wherein the one or more multi-node transient processing pathways comprise a plurality of multi-node transient processing pathways, and wherein the computer-implemented method further comprises:
  constructing, by the one or more processors and based on a risk level indicated by the probabilistic threat assessment, a respective one of the plurality of multi-node transient processing pathways for each respective one of a plurality of functions required to interact with data.

6. The computer-implemented method of claim 4, wherein the probabilistic threat assessment indicates a respective threat level, and wherein a frequency of adjusting each of the one or more multi-node transient processing pathways is based on the respective threat level.

7. The computer-implemented method of claim 1, further comprising:
  altering, by the one or more processors, each of the one or more multi-node transient processing pathways to have a different topology based on which of a plurality of different types of application programming interface calls are invoked for a current session between the user device and the computer related device.

8. The computer-implemented method of claim 1, further comprising:
  re-phasing, by the one or more processors, a node topology of each of the one or more multi-mode transient processing pathways on a quasi-random scheme.

9. The computer-implemented method of claim 1, wherein each of the one or more multi-node transient processing pathways includes a beginning node, an end node, and a plurality of intervening nodes, and wherein the computer-implemented method further comprises:
  instantiating on demand, at least one of the plurality of intervening nodes by an out-of-plane control node, wherein the out-of-plane control node is a management node that is outside of the one or more multi-node transient processing pathways.

10. The computer-implemented method of claim 9, wherein only the beginning node is externally visible.

11. The computer-implemented method of claim 1, further comprising:
  encrypting, by the one or more processors, communications between nodes in the one or more multi-node transient processing pathways with multiple types of encryption keys, wherein at least two or more of the multiple types of encryption keys vary from node to node in the one or more multi-node transient processing pathways.

12. The computer-implemented method of claim 1, wherein active nodes in the one or more multi-node transient processing pathways between the user device and the computer related device appear and disappear over time during a current session between the user device and the computer related device.

13. The computer-implemented method of claim 1, further comprising:
  receiving, by the one or more processors, service provider registrations specifying a particular service, from the plurality of services, to be provided by a particular service provider; and receiving, by the one or more processors, user registrations that respectively register a user with various services from the plurality of services.

14. The computer-implemented method of claim 1, wherein the one or more multi-node transient processing pathways form a communication network, and wherein the method further comprises:
  sending, by the one or more processors, control signals that support the communications on a separate network from the communication network.

15. The computer-implemented method of claim 1, wherein the at least one node in the one or more multi-node transient processing pathways is a virtual machine, and wherein the computer-implemented method further comprises:
  detecting a penetration attempt on the one or more multi-node transient processing pathways between the user device and the computer related device; and
  in response to detecting the penetration attempt on the one or more multi-node transient processing pathways between the user device and the computer related device, directing, by the one or more processors, an anonymizing proxy to change a virtual Internet Protocol (IP) address of the virtual machine, wherein the anonymizing proxy does not know a physical IP address of the virtual machine that is to be changed.

16. A computer program product for providing security in a communication network between a user device and a computer related device and for receiving payment for services offered through a distributed registry associated with the communication network, the computer program product comprising a non-transitory computer readable storage medium having program code embodied therewith, wherein reading and executing the program code by a processor performs a method comprising:
  providing a distributed registry that specifies a plurality of services available to support communications between a user device and a computer related device on a communication network, wherein the plurality of services are from a group of services consisting of an anonymizing proxy service for providing one-way or two-way anonymity for the communications, indirection services, workload virtual machines services, and out-of-band control communication services;
  constructing one or more multi-node transient processing pathways between the user device and the computer related device based on a first service from the plurality of services; and adjusting the at least one node in the one or more multi-node transient processing pathways between the user device and the computer related device based on a second service from the plurality of services, wherein for said at least one node in each of the one or more multi-node transient processing pathways, an address thereof and the predefined time period that the at least one node is active and capable of being used is adjusted based on at least one of an application programming interface type and a data request type implicated by a received packet by the user device.

17. The computer program product of claim 16, wherein the at least one node in the one or more multi-node transient processing pathways is a virtual machine, and wherein the method further comprises:
detecting, a penetration attempt on the one or more multi-node transient processing pathways between the user device and the computer related device; and
in response to detecting the penetration attempt on the one or more multi-node transient processing pathways between the user device and the computer related device, directing an anonymizing proxy to change an Internet Protocol (IP) address of the virtual machine without providing the anonymizing proxy with a reason for why the IP address of the virtual machine is to be changed.

18. The computer program product of claim 16, wherein the method further comprises:
presenting the plurality of services specified by the distributed registry to the user device;
appending metadata describing a current cryptocurrency cost of each of the plurality of services to a descriptor of said each of the plurality of services;
receiving a request from the user device for a particular service from the plurality of services; and
in response to receiving the request from the user device for a particular service from the plurality of services, charging the current cryptocurrency cost to a cryptocurrency account associated with the user device and providing the particular service to the user device.

19. A computer system comprising: a processor, a computer readable memory, and a non-transitory computer readable storage medium, wherein the processor loads instructions from the non-transitory computer readable storage medium onto the computer readable memory, and wherein the processor executes the instructions that are loaded from the non-statutory computer readable storage to perform a method comprising:
providing a distributed registry that specifies a plurality of services available to support communications between a user device and a computer related device on a communication network, wherein the plurality of services are from a group of services consisting of an anonymizing proxy service for providing one-way or two-way anonymity for the communications, indirection services, workload virtual machines services, and out-of-band control communication services;
constructing one or more multi-node transient processing pathways between the user device and the computer related device based on a first service from the plurality of services; and
adjusting the at least one node in the one or more multi-node transient processing pathways between the user device and the computer related device based on a second service from the plurality of services, wherein for said at least one node in each of the one or more multi-node transient processing pathways, an address thereof and the predefined time period that the at least one node is active and capable of being used is adjusted based on at least one of an application programming interface type and a data request type implicated by a received packet by the user device.

20. The computer system of claim 19, wherein the method further comprises:
presenting the plurality of services specified by the distributed registry to the user device;
appending metadata describing a current cryptocurrency cost of each of the plurality of services to a descriptor of said each of the plurality of services;
receiving a request from the user device for a particular service from the plurality of services; and
in response to receiving the request from the user device for a particular service from the plurality of services, charging the current cryptocurrency cost to a cryptocurrency account associated with the user device and providing the particular service to the user device.

* * * * *